UNITED STATES PATENT OFFICE.

OSWALD SILBERRAD, OF BUCKHURST HILL, ENGLAND.

SULFUR DYE.

1,268,803.  Specification of Letters Patent.  Patented June 4, 1918.

No Drawing.   Application filed March 1, 1918.   Serial No. 219,918.

*To all whom it may concern:*

Be it known that I, OSWALD SILBERRAD, a subject of the King of Great Britain and Ireland, and residing at The Silberrad Research Laboratories, Buckhurst Hill, in the county of Essex, England, have invented certain new and useful Improvements in and Relating to Sulfur Dyes, of which the following is a specification.

This invention relates to an improved manufacture of brown coloring matters of the class known as sulfur colors.

I have discovered that by treating the residues obtained in the purification of trinitrotoluene I obtain a most valuable bright brown which compares favorably with that hitherto believed to be obtainable only from the expensive compound meta toluylene diamin.

My invention therefore consists in the production of a valuable brown coloring matter from the residue obtained in the purification of trinitrotoluene by heating that residue with sodium sulfid and sulfur.

According to one example my invention may be carried out as follows:—

100 parts of sodium sulfid concentrated solution, containing about 62% of actual $Na_2S$; 100 parts water and 25 parts sulfur are mixed together and heated to about 100° C.; 30 parts trinitrotoluene residue are gradually added, the mixture is then slowly raised to a temperature of 240° C. and kept at that temperature for about 4 hours; the melt is cooled and then ground when it is ready for sale. The product dyes cotton direct a fine deep khaki brown from a sodium sulfid bath.

The proportions of sodium sulfid, water and trinitrotoluene residue may be varied considerably but the above proportions will be found to produce excellent results. Alternatively, the trinitrotoluene residue may be added to the boiling mixture of sodium sulfid and water and the sulfur added subsequently, the mass being then heated as previously described, but this modification of the process does not give so good a product.

The trinitrotoluene residue herein referred to is for example the residuum left after distilling off the alcohol from the mother liquor obtained in recrystallizing trinitrotoluene.

This residue consists, as is well known, of the oily nitro compounds which remain behind after distilling off the alcohol from the mother liquors obtained in recrystallizing crude trinitrotoluene from alcohol, or in washing crude trinitrotoluene with alcohol. This residue consists essentially of a mixture of the 2.3 and 3.4 dinitrotoluenes, and the 2.3.4 and 3.4.6 trinitrotoluenes, which compounds, either alone or in the presence of the well known isomers, namely 2.4 and 2.6 dinitro- and 2.4.6 trinitrotoluenes, give rise to valuable coloring matters.

Having now described my invention what I claim as new and desire to secure by Letters Patent is:—

1. The process of making a brown sulfur dye which comprises heating with alkali metal sulfid and sulfur, the oily residue separated from trinitrotoluene, during the purification of the latter by recrystallization from alcohol, which residue contains various di- and tri-nitro toluenes.

2. The herein described brown sulfur dye containing the reaction products of alkali metal sulfid, sulfur and the oily residue obtained in the purification of trinitrotoluene which residue contains various di- and tri-nitro toluenes.

In testimony whereof I have signed my name to this specification.

OSWALD SILBERRAD.